Dec. 13, 1938.     S. W. THOMPSON     2,140,096
PLANTER
Filed March 3, 1937     3 Sheets—Sheet 1
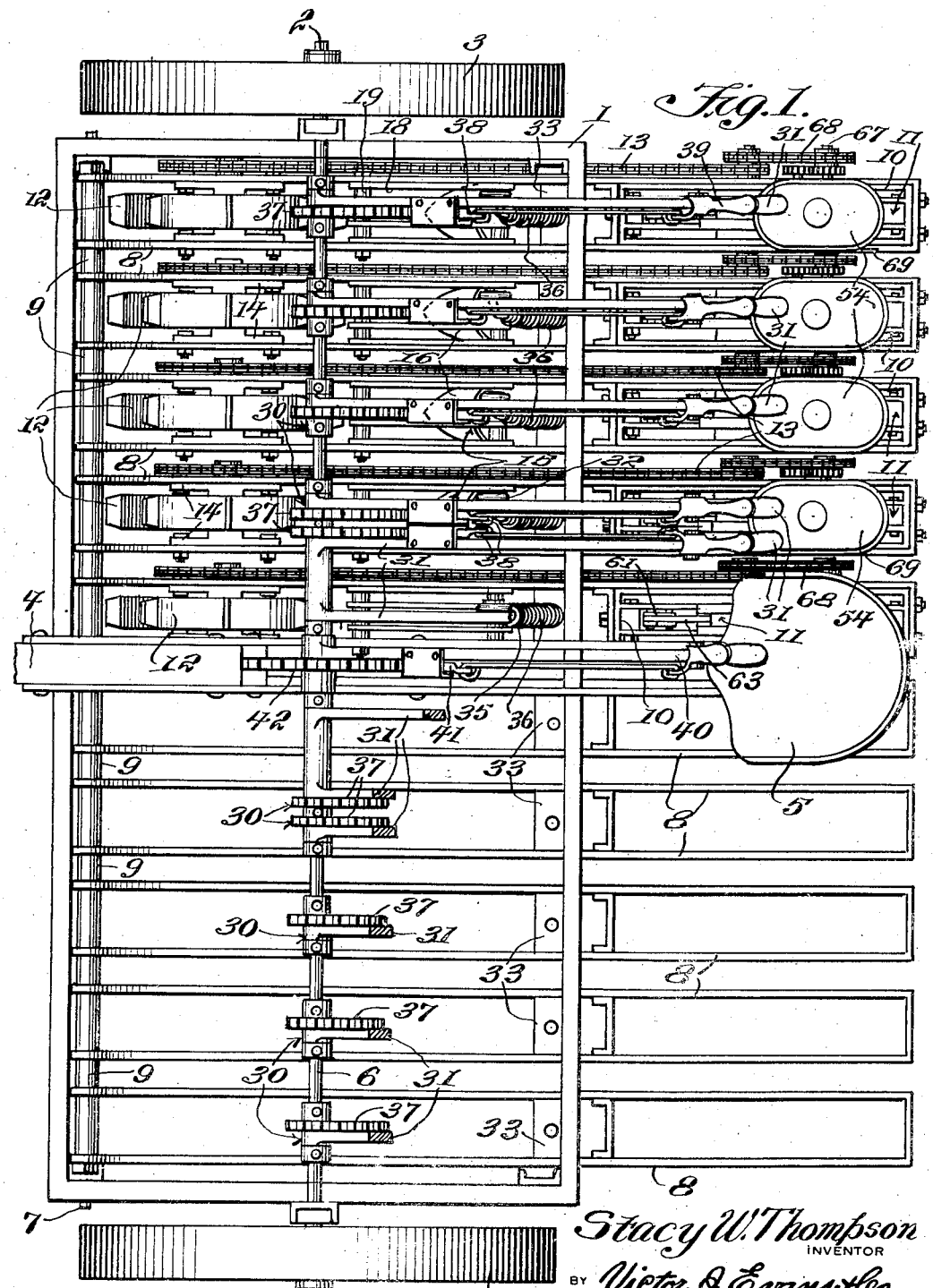

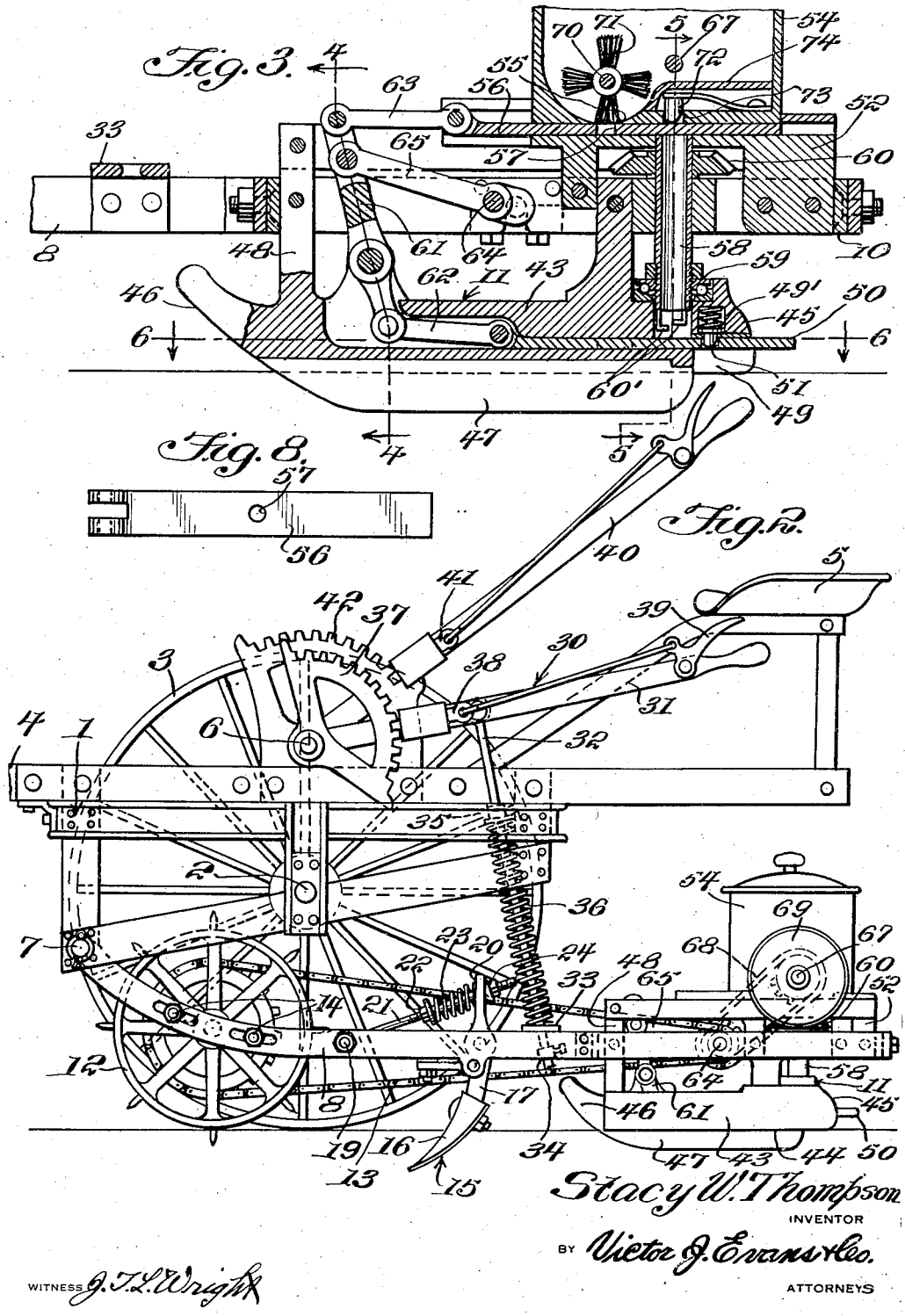

Dec. 13, 1938.   S. W. THOMPSON   2,140,096
PLANTER
Filed March 3, 1937   3 Sheets-Sheet 3
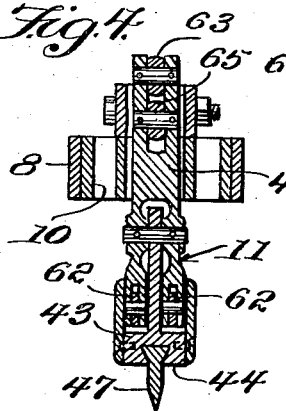
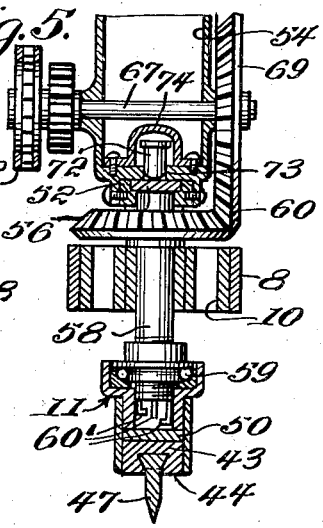
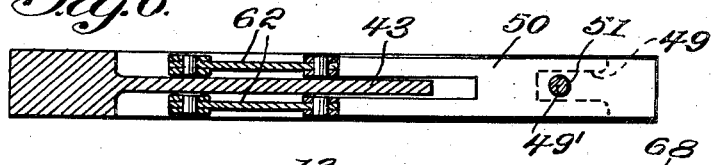
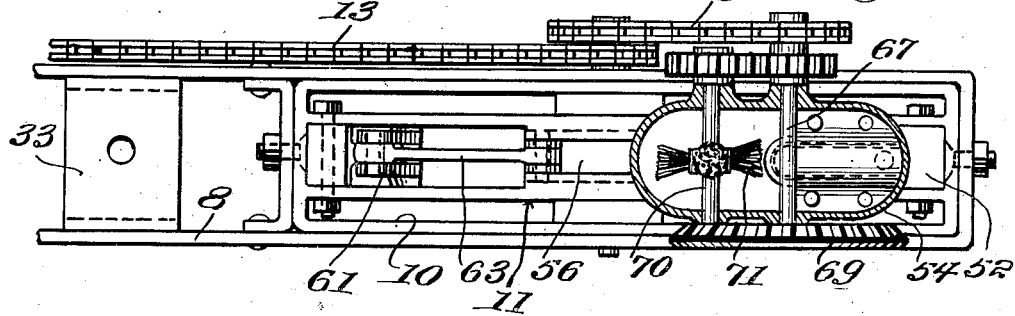

Patented Dec. 13, 1938

2,140,096

UNITED STATES PATENT OFFICE 2,140,096

PLANTER

Stacy Willam Thompson, Weldon, Tex., assignor of one-fourth to W. G. Clark, Weldon, Tex.

Application March 3, 1937, Serial No. 128,859

2 Claims. (Cl. 111—34)

This invention relates to a planter capable of planting various kinds of seeds and is especially adaptable for planting onion seeds with waste of seeds reduced to a minimum.

The primary object of the invention is the provision of a device of the above stated character which will prepare the ground to receive the seeds and deposit during each dropping operation a predetermined number of seeds in close proximity to the surface of the prepared ground so that the seeds will not be scattered or lost by being blown away and which may be readily adjusted to plant at various depths.

Another object of the invention is the provision of means including a plurality of planting or drilling mechanisms each readily adjustable as to its depth of planting operation and having means whereby all planting or drilling mechanisms may be simultaneously adjusted with respect to the ground.

A further object is the provision of means which will permit the furrow forming devices to automatically yield and rise when contacting obstructions so as to clear said obstructions without damage.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a top plan view illustrating a planter with some of the planting mechanisms omitted.

Figure 2 is a fragmentary side elevation showing the planter and one of the planting mechanisms and the means for driving the latter.

Figure 3 is a fragmentary vertical sectional view showing one of the planting mechanisms.

Figure 4 is a sectional view taken on the line 4—4 of Figure 3.

Figure 5 is a sectional view taken on the line 5—5 of Figure 3.

Figure 6 is a sectional view taken on the line 6—6 of Figure 3.

Figure 7 is a fragmentary longitudinal sectional view showing one of the planting mechanisms.

Figure 8 is a plan view illustrating one of the control gates employed in the planting mechanism.

Referring in detail to the drawings, the numeral 1 indicates a main frame having secured thereto an axle 2 on which are journaled ground wheels 3. Secured to the frame 1 and extending forwardly and rearwardly thereof is a draft tongue 4 and supported by the rear portion of the latter is an operator's seat 5. Above the axle 2 and journaled on the frame 1 is a control shaft 6. A shaft 7 is secured to the forward portion of the frame 1 and has journaled thereon the forward ends of a plurality of auxiliary elongated frames 8 being held in spaced relation to each other by spacers 9 on the shaft 7. The auxiliary frames 8 extend a considerable distance rearwardly of the main frame and the rear portions thereof have detachably secured thereto sub-frames 10 forming part of planting mechanisms 11 each of which is identical in construction and will be hereinafter described in detail. Drive wheels 12 are journaled to the forward portions of the auxiliary frames 8 for contact with the ground and receive rotation by the forward movement of the planter. The drive wheels 12 are connected to the planting mechanisms 11 by sprocket chains 13 and are adjustable longitudinally of the frames 8, as shown at 14, for the purpose of tightening the sprocket chains.

Furrow forming devices 15 are carried by the auxiliary frames 8 and are located rearwardly of the drive wheels 12 and forwardly of the planting mechanisms 11 and each includes a shovel-like ground engaging element 16 detachably secured to a shank 17. Each shank 17 is pivotally and swingably mounted in its auxiliary frame 8 with its upper end portion 20 projected some distance above the frame and being apertured to slidably receive a rod 21 which is pivotally mounted on the auxiliary frame, as at 19. A spring seat 22 is adjustably secured to the rod 21 and is engaged by one end of a coil spring 23, the other end of the latter bearing against the shank for maintaining the ground engaging element yieldably in furrow forming position. An adjustable stop 24 is threaded on the rod for limiting the movement of the rod through the apertured end portion 20 of the shank in one direction or, in other words, for limiting the pivotal movement of the shank in one direction.

Each auxiliary frame has a hand control 30 whereby the auxiliary frame may be raised and lowered with respect to the ground to govern the depth of the furrow made by the ground engaging element 16 and also the relation of the planting mechanism with respect to the ground and of a type capable of yielding to permit the auxiliary frame to rise when the planting mechanism passes over an obstruction. The hand control consists of a hand lever 31 journaled on the shaft 6 and has pivoted thereto a rod 32 passing through a plate 33 mounted on the auxiliary frame and equipped with an adjustable stop 34. A spring seat 35 is secured to the rod 32 and is engaged by one end of a coil spring 36, the other end of the spring engaging the plate 33. A segmental rack 37 is secured on the shaft 6 and is engaged by a dog 38 carried by the hand lever 31 and which may be moved into and out of engagement with the segmental rack by a hand grip 39. A main control lever 40 similar in construction to the hand lever 31 is secured to the shaft 6 and the dog 41 thereof engages with a segmental rack 42 secured to the frame draft tongue 4. The main control lever normally acts to secure the shaft 6 against rotation so that by adjusting the hand lever 31 with respect to the segmental rack 37 the auxiliary frames may be varied with respect to the ground and when it is desired to raise or lower the auxiliary frames simultaneously the main control lever 40 is moved relative to the rack gear 42.

The planting mechanisms 11 each include an elongated shoe 43 having a ground engaging face 44 and provided with a heel 45 and an upwardly curved toe 46. Removably secured to the shoe and extending longitudinally thereof and projecting below the ground engaging face 44 is a knife blade 47. The knife blade is dove-tailed into the shoe 43 and is removable from the toe end 46 of the shoe. Standards 48 are formed on the shoe and are secured to the subframe 10. A discharge port 49 is formed in the shoe at the heel end 45 rearwardly of the rear end of the knife blade 47 and opens outwardly through the top face of the shoe and is intercepted by a slot formed in the shoe in which is slidably mounted a control gate 50 having a port 51 adapted to move into and out of communication with the discharge port 49 and when positioned out of communication with said port 49 prevents seeds from passing therefrom into the furrow formed in the ground. A spring pressed plunger 49' rides into and out of the port 51 to eject seeds therefrom and assure against the port becoming clogged with seeds.

A substructure 52 is carried by the subframe 10 and has mounted thereon a seed hopper 54 having a discharge port 55. Formed in the substructure 52 is a groove slidably supporting a control gate 56 having a port 57 adapted to open and move into and out of registration with the port 55 of the hopper and also is adapted to move into registration with the upper end of a transfer tube 58 journaled in the substructure 52 and which extends from the hopper to the exhaust port 49 of the shoe. The transfer tube 58 is rotatably mounted being supported by anti-friction bearings 59 and has secured thereto a gear 60. A lever 61 is pivotally mounted on the shoe 43 and one end thereof is connected to the gate 50 by links 62 and the other end is connected to the gate 56 by a link 63. The subframe 10 has journaled thereon a crank shaft 64 to which is connected a connecting rod 65 and the latter is pivotally connected to the lever 61 for imparting a rocking motion thereto. As the lever 61 rocks on its pivot the gates 50 and 56 move in opposite directions. The crank shaft 64 is connected to the sprocket chain 13. Journaled in the hopper is a shaft 67 connected to the crank shaft 64 by a sprocket chain 68. The shaft 67 has secured thereto a gear 69 meshing with the gear 60 for the purpose of rotating the transfer tube. The purpose of rotating the transfer tube is to prevent the tube from becoming choked with seed. Hook-shaped fingers 60' are carried by the lower end of the transfer tube to agitate the seeds as they leave said tube. Geared to the shaft 67 is an agitator shaft 70 journaled in the hopper 54 and to which is secured a rotating brush 71. The rotating brush acts as an agitator in the hopper and also has wiping contact with the gate 56 by way of the exhaust port 55 of the hopper so that the opening or port 57 when receiving seed from the hopper will only become filled with seeds sufficient to fill said opening so that as the plate 56 moves to the right in Figure 3, the seeds within the opening 57 follow into the transfer tube 58, consequently delivering to said tube a predetermined amount of seed. The seed passes from the tube 58 into the exhaust port 49 and is allowed at spaced distances of the movement of the shoe to deposit into the furrow by the port 51 moving in communication with the exhaust port 49. A spring pressed plunger 72 is located in the hopper 54 and extends through an opening 73 in the bottom of the hopper to contact the gate 56 and as the port 57 thereof aligns with the tube 58 the plunger enters said port to assure the port of becoming free of the seed therein so that said seed will be positively transferred to the tube 58. The movement of the gate 56 to unalign the port 57 from the tube 58 will bring about a movement of the plunger 72 out of the port 57. A false bottom 74 located in the hopper protects the spring pressed plunger 72 from the seeds in the hopper and also acts to direct the seeds of the hopper towards the exhaust port 55. Thus it will be seen that during the forward movement of this device furrows will be formed in the ground and at predetermined distances apart seeds will in predetermined amounts be deposited in said furrows and further it will be noted that the furrow forming devices as well as the planting mechanisms can be easily raised and lowered with respect to the ground for the purpose of governing the depth of the furrows made and the depth of the planting of the seeds. Also the seeds when discharged from the planting mechanisms will be within the walls of the furrows so that said seeds will be less liable to be blown away by wind.

What is claimed is:

1. A planter comprising a frame, a shoe secured to said frame and having a port, a hopper carried by the frame and having a port, a rotatably mounted tube in communication with the port of the shoe, a gate having a port to communicate with the port of the hopper and with the tube for depositing a predetermined amount of seed in the tube, a gate for controlling the port of the shoe, a lever pivoted to the shoe, means connecting the lever to the gates for reciprocating said gates in opposite directions, means for imparting movement to the lever, and means for rotating the tube.

2. A planter comprising a frame, a shoe secured to said frame and having a port, a hopper carried by the frame and having a port, a tube rotatably mounted in the shoe and having communication with the port of the shoe, a gate having a port to communicate with the port of the hopper and with the tube for depositing a predetermined amount of seed in the tube, a gate for controlling the port of the shoe, a lever pivoted to the shoe, means connecting the lever to the gates for reciprocating said gates in opposite directions, means for imparting movement to the lever, means for rotating the tube, and agitating fingers carried by said tube and located adjacent the port of the shoe.

STACY WILLAM THOMPSON.